United States Patent [19]

Marquart

[11] 4,296,649
[45] Oct. 27, 1981

[54] HYDRAULICALLY OPERATED TRANSMISSION CONTROL

[75] Inventor: Gordon L. Marquart, Jesup, Iowa
[73] Assignee: Deere & Company, Moline, Ill.
[21] Appl. No.: 27,158
[22] Filed: Apr. 4, 1979
[51] Int. Cl.³ .................. F16H 5/78; F16D 67/04; B60K 17/34
[52] U.S. Cl. ........................... 74/751; 74/11; 137/488; 137/625.6; 180/53 D; 180/233; 192/4 A; 192/12 C
[58] Field of Search ............... 74/740, 752 C, 687, 74/688, 689, 11, 335, 751; 137/119, 625.6, 488; 251/297; 180/53 D, 233; 192/4 A, 12 C

[56] References Cited

U.S. PATENT DOCUMENTS

| | | | |
|---|---|---|---|
| 3,018,786 | 1/1962 | Stratton | 251/297 X |
| 3,469,472 | 9/1969 | Bislew | 74/740 X |
| 3,669,147 | 6/1972 | Farrell | 137/625.6 |
| 3,788,339 | 1/1974 | Denker | 137/119 X |
| 3,916,934 | 11/1975 | Koenig | 74/752 C X |
| 3,927,579 | 12/1975 | Golan | 74/752 C |
| 3,998,111 | 12/1976 | Blake | 74/752 C |
| 4,083,382 | 4/1978 | Khatti et al. | 192/4 A X |
| 4,139,015 | 2/1979 | Sakai | 74/867 X |
| 4,235,415 | 11/1980 | Heckenkamp | 192/12 C X |

Primary Examiner—Allan D. Herrmann
Attorney, Agent, or Firm—Fraser and Bogucki

[57] ABSTRACT

A hydraulically operated control arrangement for a transmission includes a spring-loaded pressure regulating valve which slides into a position to cut off an exit chamber for hydraulic fluid from an input chamber for pressurized hydraulic fluid so as to route the incoming hydraulic fluid exclusively to the transmission for various control and lubricating functions when hydraulic fluid pressure in the input chamber falls below a first threshold value. Hydraulic fluid applied to the input chamber continues to feed a first plurality of functions within the transmission via the input chamber and a second plurality of functions in the transmission via an intermediate chamber disposed between the input and exit chambers and in communication with the pressure regulating valve until such time as the hydraulic fluid pressure at the input chamber drops below a second threshold value so as to permit the pressure regulating valve to cut off the intermediate chamber from the input chamber. Loss of hydraulic fluid pressure also causes movement of a power takeoff control lever to the disengaged or off position through the action of a power takeoff control valve which operates a detent arrangement and movement of a planetary control lever into a low position through the action of a high-low control valve.

20 Claims, 4 Drawing Figures

HYDRAULICALLY OPERATED TRANSMISSION CONTROL

BACKGROUND OF THE INVENTION

1. Field of the Invention

The present invention relates to transmission controls, and more particularly to hydraulically operated control arrangements for use with transmissions in tractors or other agricultural vehicles.

2. History of the Prior Art

It is well known to control transmissions such as those used for tractors and other agricultural vehicles using hydraulically operated controls for monitoring various conditions within the transmission and for selectively applying pressurized hydraulic fluid to different portions of the transmission to perform various different functions. The control may, for example, control the application of hydraulic fluid to the clutches within the planetary section of the transmission to effect shifting between direct drive and underdrive conditions where the clutches are hydraulically operated. The control may also be used to selectively control the application of hydraulic fluid to such things as a power takeoff shaft and a mechanical front wheel drive where these portions of the transmission are also hydraulically operated.

Most conventional hydraulically operated transmission controls function satisfactorily for many applications, so long as full or optimum hydraulic fluid pressure is available. However, if hydraulic fluid pressure is reduced due to leakage or malfunction in one or more parts of the system or is completely lost such as where the engine stalls or cannot be started, conventional controls are generally incapable of functioning at all under such conditions and may even pose a danger of damage to or destruction of various parts of the transmission. As an example of this a partial loss in hydraulic fluid pressure may result in the two different clutches within the planetary section of the transmission being partially engaged. Since one of the clutches attempts to couple the rotatable carrier of the planetary section to a stationary housing while the other clutch attempts to couple the carrier to a rotatable drive shaft within the transmission, frictional elements within the clutches may burn up as a result.

Conventional transmission controls typically fail to distinguish between different hydraulic fluid utilizing functions within the transmission on a priority basis. Consequently, a slight reduction in hydraulic fluid pressure may cause a safety device to completely cut off the flow of hydraulic fluid to all parts of the transmission. Not only is this dangerous in terms of damage to or destruction of certain parts which may malfunction upon partial pressure loss or when pressure is removed too quickly but it ignores the fact that various different portions of the transmission vary greatly in terms of their need for full or partial hydraulic fluid pressure to continue operating safely or normally.

Conventional transmission controls additionally lack certain features which would make them safer or more useful including such things as efficient and effective low pressure warning devices and arrangements capable of automatically shifting a control into a different range or condition upon partial or complete loss of hydraulic fluid pressure.

Accordingly, it is an object of the invention to provide an improved hydraulically operated transmission control.

It is a further object of the invention to provide a transmission control capable of conserving hydraulic fluid pressure upon a reduction in pressure at the source and of applying the remaining fluid to various different portions of a transmission on a priority basis.

It is a further object of the invention to provide a transmission control in which hydraulic fluid may be used to maintain a control for the transmission in a given condition so that the control is readily changed to provide a different condition upon reduction or loss of the hydraulic fluid pressure.

It is a still further object of the invention to provide a transmission control in which a portion of the transmission can be controlled by a valve arrangement which automatically changes the control portion of the transmission to a different condition upon reduction or loss in hydraulic fluid pressure.

BRIEF DESCRIPTION OF THE INVENTION

Hydraulically operated transmission controls in accordance with the invention include a pressure regulating valve which responds to a drop in pressurized hydraulic fluid from a source to block the exit of the fluid from the control to other than portions of the transmission. The pressure regulating valve responds to an even further reduction in the hydraulic fluid pressure by cutting off the supply of the fluid to some portions of the transmission in favor of other portions, thereby establishing a priority system. Movement of the pressure regulating valve by a sufficient distance in response to reduction in hydraulic fluid pressure results in completion of an electrical circuit to a low hydraulic fluid pressure warning light. Transmission controls in accordance with the invention apply the hydraulic fluid to detents used to maintain a power takeoff control lever in an engaged or on position. Upon loss in hydraulic fluid pressure, the detents release, allowing a power takeoff valve which also responds to the loss in hydraulic fluid pressure to pull the power takeoff control into the disengaged or off position. The transmission control includes a high-low control valve coupled to a control lever for the planetary section of the transmission and responsive to movement of the control lever and the coupled control valve into a high or direct drive position to hold the valve in the direct drive position by the hydraulic fluid pressure to the transmission control to provide the hydraulic fluid to the clutches within the planetary section of the transmission. Upon significant reduction or loss in hydraulic fluid pressure, the high-low control valve is operative to automatically move the control lever into the low or underdrive condition while at the same time cutting off the application of hydraulic fluid to the planetary section of the transmission.

In a preferred embodiment of a hydraulically operated transmission control in accordance with the invention, the pressure regulating valve comprises a generally cylindrical element slidably disposed within a generally cylindrical bore within a housing. Hydraulic fluid is applied to an input chamber within the housing coupled to the bore for the pressure regulating valve at a first location spaced-apart from a second location where an exit chamber is located for returning hydraulic fluid to portions of the system other than the transmission. Hydraulic fluid operated portions of the transmission of lower priority are fed from an intermediate chamber coupled to the bore for the pressure regulating valve between the input and exit chambers. The intermediate chamber is coupled to operate power takeoff, mechanical front wheel drive and priority lubrication portions of the transmission. A contact assembly mounted within the bore adjacent the input chamber is engaged by a plunger on the pressure regulating valve upon loss of a predetermined amount of hydraulic fluid pressure so as to complete an electrical circuit to a low hydraulic fluid pressure warning light mounted on the dashboard of the tractor.

The input chamber is coupled to an opposite pair of hydraulically operated detents for maintaining a power takeoff control lever in an engaged or on position. Upon loss of hydraulic fluid pressure, a power takeoff control valve mounted within the housing and coupled to the power takeoff control lever reacts to the loss in pressure by pulling the control lever from the engaged into the disengaged position while at the same time cutting off the supply of hydraulic fluid to portions of the power takeoff assembly of the transmission which provide engagement by the application of such fluid. This action is aided by the hydraulically operated detents which release to readily permit movement of the control lever out of the engaged or on position upon loss in hydraulic fluid pressure.

The high-low control valve is of generally cylindrical configuration and is mounted within a cylindrical bore in the housing in conjunction with a second valve and mating bore. The high-low control valve which is coupled to the control lever for the planetary section of the transmission is engaged by a resilient detent means so as to be urged into high or low positions. The control valve is operative to apply hydraulic fluid from the input chamber to the planetary section of the transmission when in the high position and to cut off the supply of hydraulic fluid when in the low position. The control valve which is normally urged into the low position by an associated spring can be moved into the high position by manual actuation of the coupled control lever and will remain in the high position by action of hydraulic fluid pressure applied from the input chamber to the bore containing the second valve. The pressure within the bore of the second valve forces the second valve into a position against the urging of an associated spring so as to couple the hydraulic fluid through a portion of the second valve and a chamber within the housing to an end of the bore containing the high-low control valve. Hydraulic fluid pressure entering the bore of the control valve permits the valve to be in the high position against the urging of the associated spring. When hydraulic fluid pressure falls to a level sufficient to provide movement of the second valve which cuts off the supply of hydraulic fluid to the high-low control valve, the control valve is moved into the low position by action of the associated spring.

BRIEF DESCRIPTION OF THE DRAWINGS

The foregoing and other objects, features and advantages of the invention will be apparent from the following more particular description of a preferred embodiment of the invention as illustrated in the accompanying drawings, in which.

DETAILED DESCRIPTION

Figure 1:
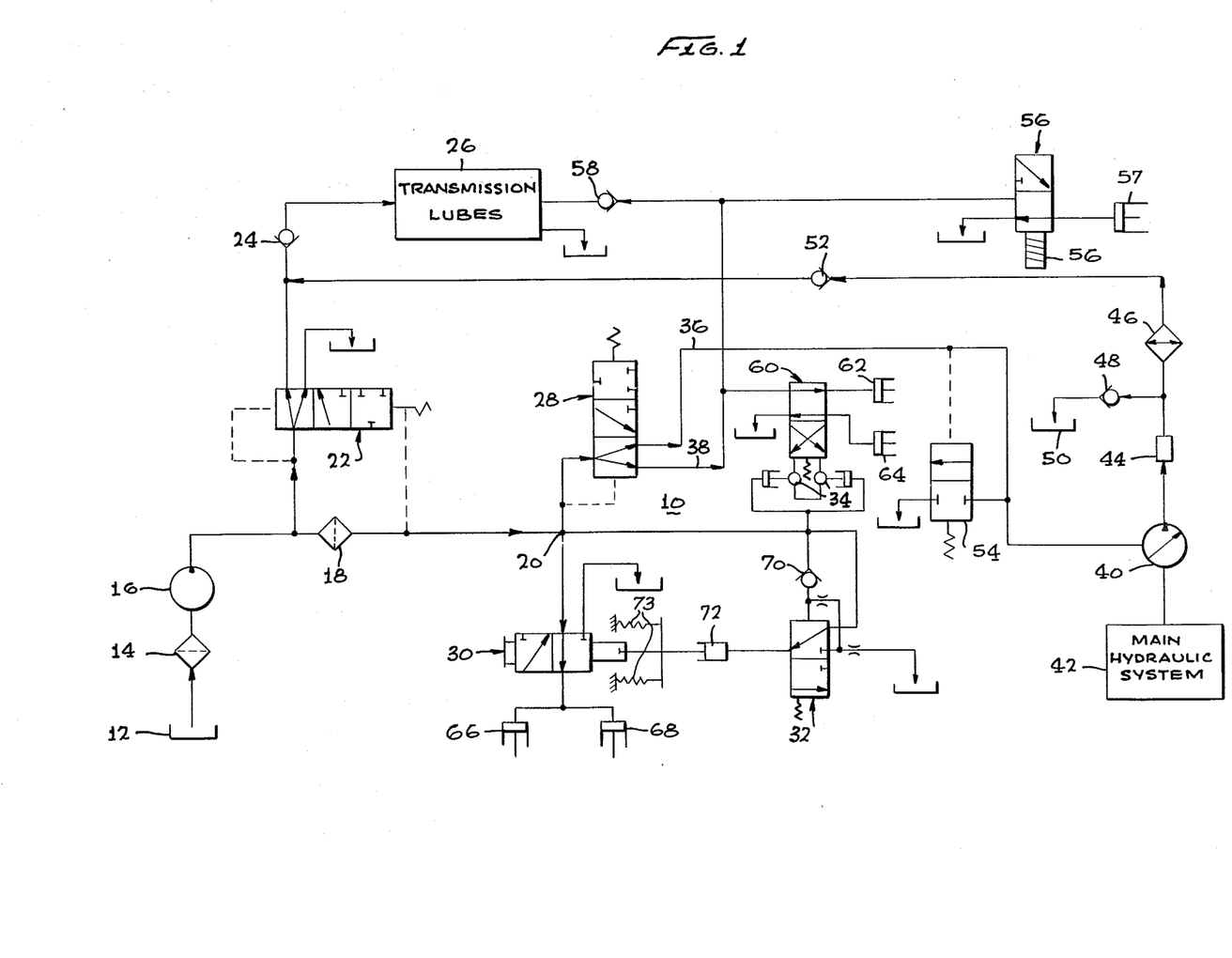
FIG. 1 is a schematic diagram of portions of a transmission having a hydraulically operated transmission control in accordance with the invention.

FIG. 1 depicts a portion of a transmission including a hydraulically operated transmission control 10 in accordance with the invention. Hydraulic fluid from a sump 12 at the bottom of the transmission housing flows through an inlet screen 14 to a charge pump 16 driven by one of the shafts within the transmission. The pump 16 pumps hydraulic fluid through a filter 18 to a point 20 corresponding to the input chamber in the embodiment of FIG. 2.

The input side of the filter 18 is coupled through a filter bypass valve 22 and a check valve 24 to transmission lubes 26 representing various different parts and locations within the transmission requiring hydraulic fluid. The filter bypass valve 22 is normally positioned so as to force hydraulic fluid from the pump 16 through the filter 18 and to the point 20 rather than admitting the fluid directly to the transmission lubes 26. However, in the event the filter 18 becomes clogged to such an extent that it offers substantially high resistance to transmission fluid from the pump 16, the filter bypass valve 22 reacts by passing the transmission fluid directly to the transmission lubes 26 via the check valve 24 to provide some fluid to the lubes 26.

Hydraulic fluid from the filter 18 applied at the point 20 flows from the point 20 to a pressure regulating valve 28, a high-low control valve 30 having an autoshift valve 32 and a pair of hydraulic detents 34. The pressure regulating valve 28 has a pair of outputs 36 and 38. The output 36 is coupled to a main hydraulic pump 40 which itself is coupled between a main hydraulic system 42 for the vehicle and a reservoir 44 and a cooler 46. The coupling between the reservoir 44 and the cooler 46 is coupled through a check valve 48 to a sump 50. The side of the cooler 46 opposite the reservoir 44 is coupled to the transmission lubes 26 through the check valve 24 and a check valve 52. A cooler relief valve 54 is coupled between the main hydraulic pump 40 and the output 36 of the pressure regulating valve 28.

The normal path for hydraulic fluid applied to the pressure regulating valve 28 is through the output 36 to the main hydraulic pump 40. From the main hydraulic pump 40 the hydraulic fluid is cooled by the cooler 46 and then eventually passed to the transmission lubes 26 via the check valves 52 and 24. In accordance with the invention, the pressure regulating valve 28 is operative to cut off the flow of hydraulic fluid from the input thereof to the output 36 when the pressure of the fluid at the input of the valve 28 falls below a first predetermined threshold level. As described in connection with the particular embodiment of FIG. 2 the pressure regulating valve 28 responds to the loss in fluid pressure by closing off the output 36 by just enough to maintain the pressure of the fluid provided to the high-low control valve 30, the autoshift valve 32 and the hydraulic detents 34 and to the output 38. The output 38 is coupled to a mechanical front wheel drive control valve 56 having a hydraulically operated clutch release 57 and through a check valve 58 to the transmission lubes 26.

The output 38 of the pressure regulating valve 28 comprises a further feature in accordance with the invention in that it establishes priorities in the supply of hydraulic fluid upon reduction in the pressure of the fluid. As previously noted, the pressure regulating valve 28 responds to a reduction in the input pressure by closing off the output 36 as necessary to maintain the pressure. The valve 28 will eventually completely close off the output 36 if the drop in pressure is great enough. Up to this point the hydraulic fluid continues to be supplied from the point 20 to the high-low control valve 30, the autoshift valve 32 and the hydraulic detents 34 and via the output 38 to the mechanical front wheel drive control valve 56 and the transmission lubes 26. If the input pressure to the valve 28 continues to fall despite closure of the output 36, the valve 28 will eventually close off the output 38 at a lower second threshold level. This action forces the hydraulic fluid to the high-low control valve 30, the autoshift valve 32 and the hydraulic detents 34 which thereby take priority over the mechanical front wheel drive control valve 56, the transmission lubes 26, and a power takeoff (PTO) valve 60 which is also coupled to the output 38 of the pressure regulating valve 28. The PTO valve 60 controls the application of hydraulic fluid to a PTO clutch 62 within the transmission and a PTO brake 64 within the transmission.

If a control associated with the PTO valve 60 is placed in the on position to provide coupling of the PTO to the transmission, the PTO valve 60 applies hydraulic fluid from the output 38 of the pressure regulating valve 28 to the PTO clutch 62 to provide engagement of the clutch 62. At the same time, the PTO valve 60 blocks the flow of hydraulic fluid to the PTO brake 64, allowing the PTO shaft within the transmission to rotate in response to engagement of the PTO clutch 62. The hydraulic detents 34 lock the PTO control into the on or engaged position. Upon loss in hydraulic fluid pressure the PTO valve 60 responds by moving the PTO control into the off or disengaged position as described in detail hereafter in connection with FIG. 2. At the same time, the falling hydraulic fluid pressure as applied to the hydraulic detents 34 releases the pressure on the detents to allow the PTO control to be pulled automatically out of the on or engaged position by the PTO valve 60.

The high-low control valve 30 controls the application of hydraulic fluid to a high clutch 66 and a low brake release 68 within a planetary section of the transmission. The control valve 30 operates in conjunction with the autoshift valve 32 which is also responsive to hydraulic fluid pressure at the point 20. The high-low control valve 30 which is movable between high and low positions moves into the high position in response to manual actuation of an associated high-low control where it remains by action of the autoshift valve 32 assuming normal hydraulic fluid pressure at the point 20. With the control valve 30 in the high position, hydraulic fluid at the point 20 is provided to the high clutch 66 and the low brake release 68 within the planetary section. The high clutch 66 is operative to couple a rotatable carrier within the planetary section to an output sun gear mounted on a drive shaft within the transmission to achieve the high or direct drive condition. The direct drive condition is also characterized by the rotatable carrier being uncoupled from a stationary housing within the planetary section, which condition is provided by application of hydraulic fluid to the low brake release 68 to hold a clutch between the rotatable carrier and the stationary housing disengaged.

Momentary reductions in the pressure of the hydraulic fluid at the point 20 are absorbed by a check valve 70 coupled between the point 20 and the autoshift valve 32. However, pressure loss of greater than momentary duration is sensed by the autoshift valve 32 which is changed in position so as to reduce or completely cut off communication of the pressurized hydraulic fluid from the autoshift valve 32 to a downshift piston 72 coupled to the high-low control valve 30. With the resulting loss in fluid pressure at the downshift 72, the valve 30 is urged by an associated spring 73 element into the low position together with the coupled high-low control. This cuts off the supply of hydraulic fluid to the high clutch 66 and the low brake release 68. Such action causes the high clutch 66 to engage and thereby couple the rotatable carrier within the planetary section to the stationary housing. At the same time, the absence of hydraulic fluid at the low brake release 68 releases the carrier from the output sun gear within the planetary section.

The transmission control shown in FIG. 1 may be advantageously used with various different transmission arrangements, one of which is shown in a co-pending application of Peter D. Wetrich et al, SYNCHRONIZED TRANSMISSION, Ser. No. 27,156, filed Apr. 4, 1979 and commonly assigned with the present application. The Wetrich et al application describes a transmission in which the high clutch of the planetary section responds to hydraulic fluid to couple the rotatable carrier within the planetary section to the output sun gear and the clutch forming the low brake release responds to hydraulic fluid to uncouple the rotatable carrier from the stationary housing within the planetary section. When hydraulic fluid is removed, the high clutch automatically uncouples the carrier from the output sun gear by mechanical spring action. At the same time the low brake release clutch brakes the rotatable carrier to the stationary housing by mechanical spring action. The transmission described in the Wetrich et al application further includes a power takeoff shaft coupled to the transmission through a clutch which engages when hydraulic fluid is applied thereto. In the absence of hydraulic fluid, the PTO clutch automatically disengages by virtue of mechanical spring action to free the PTO shaft from the transmission in the event of hydraulic fluid pressure loss. At the same time, hydraulic fluid may be applied to a PTO brake associated with the PTO clutch to immobilize the PTO shaft. The transmission described in the Wetrich et al application further includes a mechanical front wheel drive shaft coupled to the transmission through a clutch which engages by mechanical spring action except when hydraulic fluid is applied. In the event of hydraulic fluid pressure loss, the mechanical front wheel drive shaft is automatically coupled to the transmission by action of the clutch.

Figure 2:
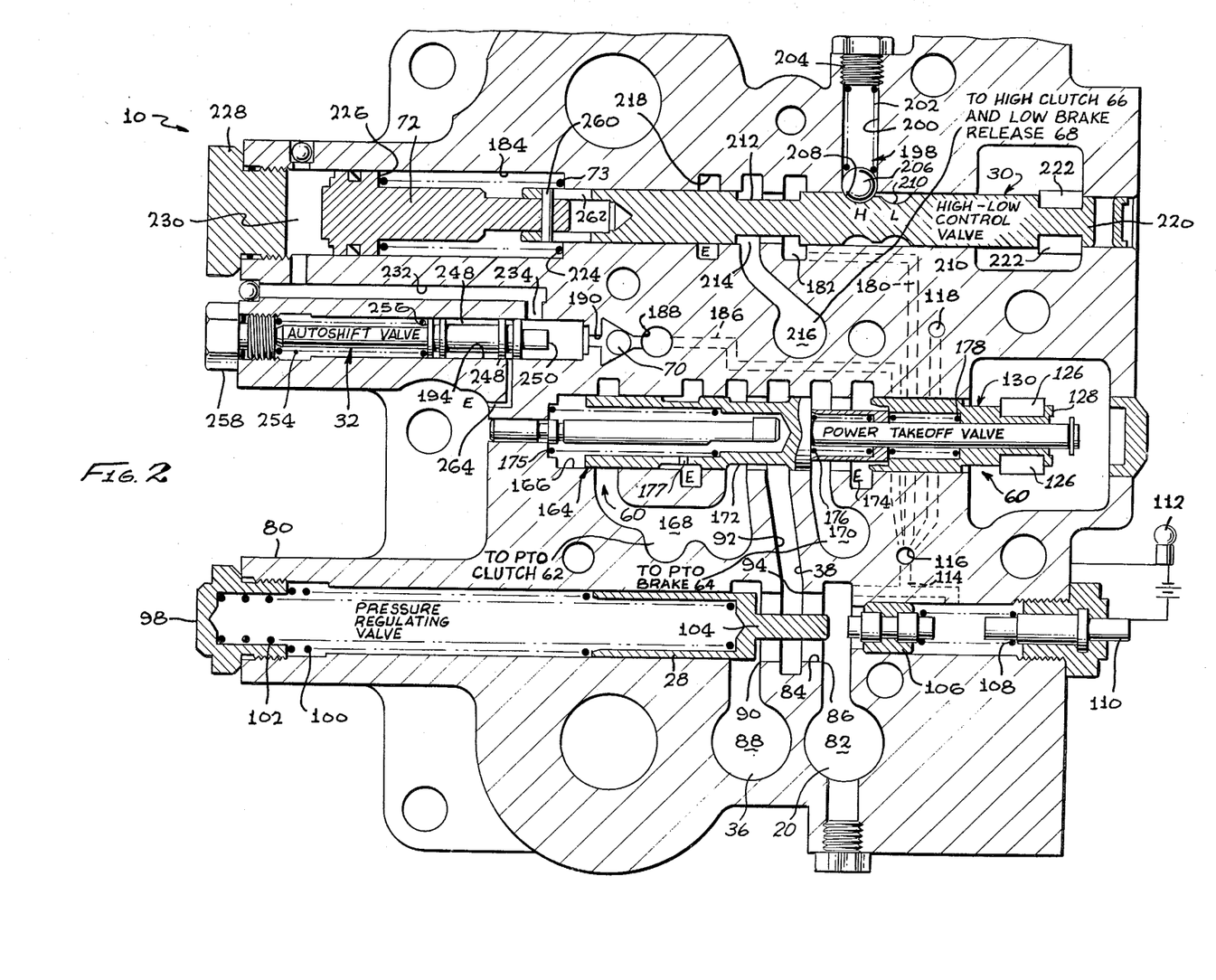
FIG. 2 is a top sectional view of a preferred embodiment of the transmission control of FIG. 1.

A preferred embodiment of a transmission control 10 in accordance with the invention is shown in sectional view in FIG. 2. The lands and other areas in FIG. 2 which are connected to sumps and which therefore define exhaust chambers are identified as "E". The transmission control 10 shown in FIG. 2 includes a housing 80 having a plurality of chambers, bores and conduits formed therein. The housing 80 includes an input chamber 82 coupled to receive pressurized hydraulic fluid such as from the filter 18 in FIG. 1 and coupled to an elongated, generally cylindrical bore 84 at a first location 86 along the length of the bore 84. The housing 80 is also provided with an exit chamber 88 coupled to the cylindrical bore 84 at a second location 90 spaced-apart from the first location 86. An intermediate chamber 92 is formed within the housing 80 so as to couple to the cylindrical bore 84 at a third location 94 intermediate the first location 86 and the second location 90. The input chamber 82 corresponds to the point 20 in the arrangement of FIG. 1. The exit chamber 88 corresponds to the output 36 of the pressure regulating valve 28 shown in FIG. 1. The intermediate chamber 92 provides the other output 38 of the valve 28 shown in FIG. 1.

In the example of FIG. 2 the pressure regulating valve 28 comprises a hollow, generally cylindrical valve mounted within the cylindrical bore 84 for sliding movement along the length of the bore. The left-hand end of the bore 84 is closed off by a plug 98. Two different coil springs 100 and 102 extend between the plug 98 and the valve 28 so as to normally urge the valve 28 toward the right as viewed in FIG. 2. In the absence of resistance to movement of the valve 28 to the right, a plunger 104 formed at the right-hand end of the valve 28 engages a contact assembly 106 and pushes the assembly 106 to the right as seen in FIG. 2 against the restraint of a coil spring 108 until the valve 28 closes off both the exit chamber 88 and the intermediate chamber 92 from the bore 84.

When a normal amount of hydraulic fluid pressure is present in the input chamber 82, this pressure forces the valve 96 to the left as seen in FIG. 2 against the resistance of the springs 100 and 102 to a position as shown in which both the exit chamber 88 and the intermediate chamber 92 communicate with the input chamber 82 via the bore 84. In the present example, normal pressure is assumed to be 10 bar. If the pressure in the input chamber 82 begins to drop, the valve 28 begins to move to the right as seen in FIG. 2 so as to partially and then completely cut off the exit chamber 88 from the input chamber 82 when the pressure in the input chamber 82 is reduced to a first predetermined threshold value of about 8.27 bar. If the pressure in the input chamber 82 continues to drop below 8.27 bar, the valve 28 continues moving to the right so as to also cut off the intermediate chamber 92 from the input chamber 82 at a second threshold value. At a pressure of approximately 8.0 bar, the plunger 104 of the valve 28 engages the contact assembly 106 to complete an electrical circuit through the metal spring 108 to a metal shaft 110 to provide illumination of a low hydraulic pressure warning light 112. The light 112 is mounted on the dashboard of the tractor so as to warn the operator of the low hydraulic pressure condition.

Figure 3:
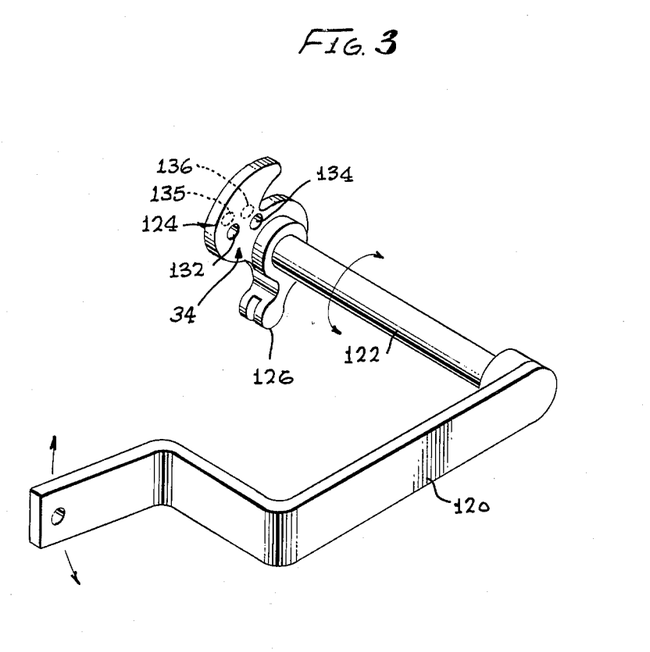
FIG. 3 is a perspective view of a portion of a power takeoff control linkage illustrating detent locations on such linkage.

The input chamber 82 is coupled to the hydraulic detents 34 through a conduit 114 formed within the housing 80 and which extends from the chamber 82 to two different locations 116 and 118. At the locations 116 and 118 the conduit 114 turns upwardly and terminates as holes in the surface of the housing 80 at the locations 116 and 118. A power takeoff (PTO) control lever 120 shown in FIG. 3 is coupled via a shaft 122 to a PTO crank assembly 124. The lower portion of the crank assembly 124 terminates in a lobe 126 coupled to an end 128 of a hollow, generally cylindrical valve 130 forming a part of the PTO valve 60 shown in FIG. 1. The arrangement shown in FIG. 3 is mounted on top of the housing 80 of FIG. 2 so as to be rotatable about the shaft 122 in response to up and down movement of the control lever 120. Up and down movement of the control lever 120 moves the valve 130 shown in FIG. 2 to the left and right respectively.

The crank assembly 124 shown in FIG. 3 is provided with recesses 132 and 134 forming a part of the hydraulic detents 34 of FIG. 1. As shown in dotted outline in FIG. 3, the opposite side of the crank assembly 124 is provided with a like pair of detent recesses 135 and 136 immediately opposite the detent recesses 132 and 134 respectively.

Figure 4:
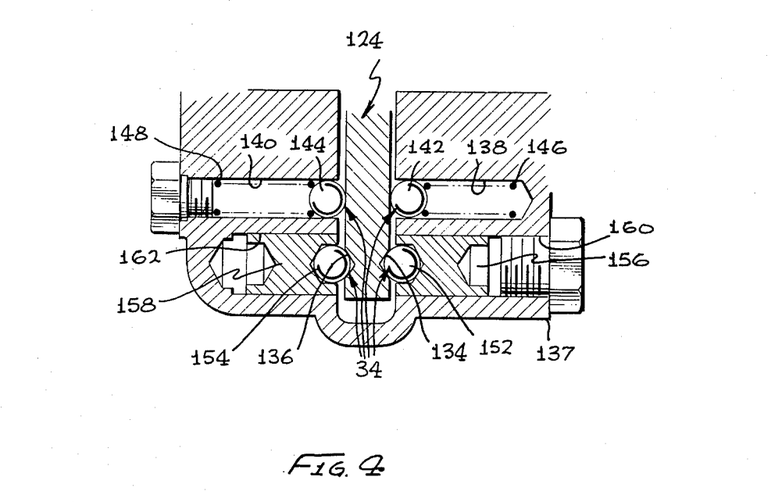
FIG. 4 is a sectional view of a hydraulic detent arrangement for use with the linkage of FIG. 3.

FIG. 4 depicts the arrangement used to engage the detent 132 recesses, 134 135 and 136 of the arrangement of FIG. 3. As shown in FIG. 4 a housing 137 surrounds the crank assembly 124. The housing 137 is provided with an opposite first pair of apertures 138 and 140 containing balls 142 and 144 respectively which form a part of the hydraulic detents 34 of FIG. 1. The ball 142 which is slidably disposed within the aperture 138 is urged in the direction of the crank assembly 124 by a spring 146 disposed within the aperture 138. In like fashion, the ball 144 which is slidably disposed within the aperture 140 is urged toward the crank assembly 124 by a spring 148. The apertures 138 and 140 are located relative to the crank assembly 124 so that the balls 142 and 144 respectively engage the detent recesses 132 and 135 when the PTO control lever is moved downwardly into a disengaged or off position. Conversely, when the PTO control lever 120 is raised into an engaged or on position, the detent recesses 134 and 136 in FIG. 4 are engaged by balls 152 and 154 respectively which also form a part of the hydraulic detents 34 of FIG. 1. The balls 152 and 154 reside within plungers 156 and 158 slidably disposed within an opposite pair of apertures 160 and 162 within the housing 137. The aperture 160 is coupled to the conduit which surfaces at the location 116 on the top of the housing 80 shown in FIG. 2. Similarly, the aperture 162 is coupled to the conduit which surfaces at the location 118 at the top of the housing 80 shown in FIG. 2.

With normal hydraulic fluid pressure present in the input chamber 82, such pressure is applied via the conduit 114 to the apertures 160 and 162 to urge the plungers 156 and 158 and the included balls 152 and 154 toward the crank assembly 124. This action disposes the balls 152 and 154 securely within the detent recesses 134 and 136 to hold the PTO control lever 120 in the engaged or on position. In the event hydraulic fluid pressure is lost, the valve 130 cooperates with other components of the PTO valve 60 to move the PTO control lever 120 from the engaged to the disengaged position. This action is facilitated by the use of the hydraulic detents 34 to hold the lever 120 in the engaged position. Thus, upon loss of hydraulic fluid pressure, the plungers 156 and 158 and the included balls 152 and 154 are freed to move outwardly and away from the crank assembly 124 to facilitate rotation of the PTO control lever 120 out of the engaged position and into the disengaged position by action of the PTO control valve 60.

In addition to the valve 130, the PTO valve 60 in the arrangement of FIG. 2 includes a hollow, generally cylindrical valve 164 slidably mounted within an elongated, generally cylindrical bore 166 together with the valve 130. The valve 130 and 164 combine to control distribution of pressurized hydraulic fluid from the intermediate chamber 92 to the PTO clutch 62 shown in FIG. 1 via a chamber 168 within the housing 80 and to the PTO brake 64 shown in FIG. 1 via a chamber 170 in the housing 80. When the valve 164 is moved to the right as seen in FIG. 2, a portion 172 thereof of reduced diameter couples the intermediate chamber 92 to the chamber 170 to apply hydraulic fluid to the PTO brake 64. To engage the PTO clutch 62, the valves 130 and 164 are moved to the left as seen in FIG. 2 by the PTO control lever 120 shown in FIG. 3. This action couples the chamber 170 to an adjacent sump outlet 174 in the bore 166 to release the PTO brake 64. Further valve movement allows hydraulic fluid from the intermediate chamber 92 to flow via the reduced diameter portion 172 of the valve 164 to the chamber 168 and then to the PTO clutch 62 as well as to the left side of the valve 164 as seen in FIG. 2. Pressure on the left side of the valve 164 balances that of a spring 175 therein. As the valve 164 moves to the fully engaged position, PTO clutch pressure to the left side of the valve 164 is blocked as shown in FIG. 2.

When hydraulic fluid pressure within the input chamber 82 is lost, the springs spring 175 within the valve 164 and within the 176 and 178 valve 130 move the valve 164 and 130 to the right as seen in FIG. 2 to cut off the application of hydraulic fluid to the PTO clutch 62 via the chamber 168 and instead apply the fluid to the PTO brake 64 via the chamber 170 while at the same time sumping the chamber 168 via the interior of the valve 164, a port 177 in the wall of the valve 164 and the exhaust land "E". This action takes place automatically in response to the pressure loss, and moves the coupled assembly shown in FIG. 3 from the engaged or on to the disengaged or off position. This operation is aided by release of the hydraulically operated detents 34 in the manner previously described.

The input chamber 82 is coupled via a conduit 180 formed within the housing 80 and shown in dotted outline in FIG. 2 to an inlet 182 at an elongated, generally cylindrical bore 184 within the housing 80. The input chamber 82 is also coupled via a conduit 186 formed within the housing 80 and shown in dotted outline in FIG. 2 to an aperture 188 within the housing 80. The aperture 188 is coupled via a short passage 190 containing the check valve 70 of FIG. 1, generally cylindrical bore 194.

A high-low control valve 30 of FIG. 1 which is of elongated, generally cylindrical configuration is disposed within the bore 184 and is slidably movable therealong between high and low positions defined by a spring-loaded ball and detent mechanism 198. A generally cylindrical bore 200 disposed at right angles to and intersecting with the bore 184 contains a coil spring 202 extending between an end cap 204 and a ball 206. The spring 202 is compressed within the bore 200 so as to urge the ball 206 into a first detent 208 in the valve 30 defining a high position or into a second detent 210 in the valve 30 defining a low position.

The high-low control valve 30 is shown in the high position in FIG. 2. With the valve 30 in the high position, a portion 212 thereof of reduced diameter extends between the inlet 182 coupled via the conduit 180 to the input chamber and an outlet 214 spaced-apart from the inlet 182 along the length of the bore 184 and coupled to a chamber 216 formed within the housing 80. The resulting pressurized hydraulic fluid within the chamber 216 is provided to the high clutch 66 and the low brake release 68 of the planetary section of the transmission as shown in FIG. 1 to provide engagement of the high clutch 66 and operation of the low brake release 68 and thereby provide the high or direct drive condition at the planetary section. If the control valve 30 is moved into the low position, the portion 212 of reduced diameter of the valve 30 surrounds both the outlet 214 to the chamber 216 and an outlet 218 coupled to a sump. This cuts off the supply of pressurized hydraulic fluid to the high clutch 66 and the low brake release 68 and at the same time allows hydraulic fluid within the clutch 66 and the release 68 to be sumped so that the low or underdrive condition is achieved at the planetary section. A right-hand end 220 of the valve 30 is coupled to a manually operated high-low control lever by a lobe 222 such that the valve 30 moves into the high or low positions in response to movement of the control lever. In addition, and as described hereafter, the control valve 30 is operative in response to loss of hydraulic fluid pressure to move automatically into the low position. The lobe 222 is like the lobe 126 and is mounted on a shaft similar to the shaft 122 of FIG. 3, but without a crank assembly, for rotation by a manually operated high-low control lever similar to the control lever 120 of FIG. 3.

The spring 73 shown in FIG. 1 comprises a coil spring which surrounds the downshift piston 72. The piston 72 is coupled to the left-hand end of the control valve 30 extends between an annular shoulder 224 in the bore 184 and an annular shoulder 226 in the downshift piston 72 so as to normally urge the piston 72 and the coupled valve 30 to the left and into the low position. The left-hand end of the bore 184 is enclosed by an end cap 228 to provide a space 230 at the left-hand end of the downshift piston 72. The space 230 is coupled via a conduit 232 within the housing 80 to a location 234 within the bore 194. Communication between the conduit 232 and the right-hand end of the bore 194 where it couples to passage 190 is controlled via the autoshift valve 32 of enlongated, generally cylindrical configuration mounted for sliding movement within the bore 194 and having a portion 248 thereof of reduced diameter adjacent a right-hand end 250 of the valve 32.

When normal hydraulic fluid pressure is present at the input chamber 82 and is thereby applied via the aperture 188 and the passage 190 to the right-hand end 250 of the valve 32, the valve 32 is moved to the left as seen in FIG. 2 against the urging of a coil spring 254 surrounding the left-hand portion of the valve 32 and extending between an annular shoulder 256 in the valve 32 and an end cap 258 sealing the left-hand end of the bore 194. Normal hydraulic pressure within the input chamber 82 moves the valve 32 to the left to a sufficient extent to clear the location 234 and open the conduit 232 to the righthand end of the bore 194. This communicates the pressurized hydraulic fluid to the space 230 at the left-hand end of the downshift piston 72. The hydraulic fluid provides a pressure within the space 230 sufficient to compress the spring 73 into a solid mass and thereby drive the piston 72 into an extreme right-hand position as shown in FIG. 2. When the downshift piston 72 is in the extreme right-hand position shown, a pin 260 mounted within the piston 72 is slidable within a slot 262 in the left end of the control valve 30 to permit the valve 30 to be manually positioned in either the high position shown or the low position.

The check valve 70 coupled between the input chamber 82 and the autoshift valve 32 slows the flow of hydraulic fluid from the autoshift valve 32 back to the input chamber 82 when the hydraulic fluid pressure within the input chamber 82 drops. Accordingly, momentary drops in the fluid pressure in the inlet chamber 82 such as typically occur when the high-low control valve 30 is manually shifted from the low position to the high position do not result in a rapid and substantial reduction in hydraulic fluid pressure at the valve 32 and the space 230 so as to allow the spring 73 to automatically move the downshift piston 72 and the control valve 30 coupled thereto by the pin 260 and the slot 262 into the low position. If the pressure drop in the inlet chamber 82 is of more than momentary duration, fluid leakage past the lands of valve 32 permits the spring 254 to urge the valve 32 slowly to the right as seen in FIG. 2. If the pressure drop within the input chamber 82 is sufficient, the valve 32 moves to such an extent that the conduit 232 linking the space 230 at the left-hand end of the downshift piston 72 with the passage 190 and the check valve 70 is cut off from the bore 194. Continued movement of the autoshift valve 32 to the right as a result of decreased hydraulic fluid pressure eventually places the portion 248 of reduced diameter adjacent both the location 234 and a conduit 264 formed within the housing 80 and coupled to a sump. This drains fluid from the space 230 and the conduit 232, permitting the downshift piston 72 to move to the left under the urging of the spring 73. Since the pin 260 is already at the left end of the slot 262, the control valve 30 is pulled to the left and into the low position. As the control valve 30 moves into the low position, the end 220 thereof pulls the attached control lever into the low position. Also, as the control valve 30 moves into the low position, the portion 212 thereof of reduced diameter is moved away from its position coupling the inlet 182 to the outlet 214 so as to cut off the flow of hydraulic fluid to the planetary section of the transmission.

The high-low control valve 30 and the associated autoshift valve 32 are particularly advantageous when used with a planetary arrangement of the type shown in the previously referred to co-pending application Ser. No. 27,156, of Wetrich et al. The two clutches in the planetary arrangement described in the Wetrich et al application provide the high or direct drive condition in response to hydraulic fluid and in the absence of hydraulic fluid automatically provide the low or underdrive condition by mechanical spring action. Upon loss of hydraulic fluid pressure, the planetary section is desirably shifted into the low or underdrive condition for safety reasons. It is therefore advantageous that the control for the planetary section be automatically shifted into a torque transmitting condition upon loss of hydraulic fluid pressure as provided by the arrangement of FIG. 2. Such arrangement is further advantageous in that it provides for shifting into the underdrive condition not just when pressure loss occurs but as soon as the hydraulic fluid pressure drops below a workable range. This prevents the dangerous situation in which a sufficiently reduced level of hydraulic fluid pressure places both clutches within the planetary section within a partially engaged condition, which condition could quickly overheat and eventually destroy the clutches.

While the invention has been particularly shown and described with reference to a preferred embodiment thereof, it will be understood by those skilled in the art that various changes in form and details may be made therein without departing from the spirit and scope of the invention.

What is claimed is:

1. A control device for a transmission comprising the combination of a source of pressurized fluid, a housing, a pressure regulating valve mounted within the housing, a first chamber within the housing communicating with the pressure regulating valve, means coupling the source of pressurized fluid to the first chamber, an additional chamber within the housing connecting with the pressure regulating valve for providing a path for pressurized fluid provided the first chamber by the source of pressurized fluid, and means for coupling the additional chamber to the transmission to provide pressurized fluid to the transmission, the pressure regulating valve normally coupling the additional chamber to the first chamber and including means responsive to fluid pressure below a predetermined threshold value within the first chamber for cutting off the first chamber from the additional chamber.

2. The invention set forth in claim 1, further including a further chamber within the housing and communicating with the pressure regulating valve, the further chamber being coupled to the transmission to provide pressurized fluid to perform at least one function different from a function performed by pressurized fluid provided the transmission from the additional chamber, the pressure regulating valve normally coupling the further chamber to the first chamber and including means responsive to fluid pressure below a second predetermined threshold value less than the first-mentioned predetermined threshold value within the first chamber for cutting off the first chamber from the further chamber.

3. The invention set forth in claim 1, further including a low fluid pressure warning light and means responsive to movement of the pressure regulating valve within the housing by a predetermined amount produced by a reduction in the fluid pressure in the first chamber for illuminating the warning light.

4. The invention set forth in claim 1, further including a power takeoff control lever having at least one detent recess therein, a retaining mechanism positioned to engage the at least one detent recess when the power takeoff control lever is in an engaged position and means coupling the first chamber to the retaining mechanism to apply pressurized fluid from the first chamber to maintain the retaining mechanism engaged with the at least one detent recess.

5. The invention set forth in claim 4, further including a power takeoff valve mounted within the housing and coupled to the power takeoff control lever, the power takeoff valve being responsive to fluid pressure in the first chamber for moving the power takeoff control lever out of the engaged position when fluid pressure in the first chamber is below a second predetermined threshold value.

6. The invention set forth in claim 1, further including a high-low valve mounted within the housing and coupled to a planetary section in the transmission, the high-low valve being movable between high and low positions and being responsive to fluid pressure in the first chamber to move from the high position to the low position when fluid pressure in the first chamber is below a second predetermined threshold value.

7. The invention set forth in claim 6, further including a further chamber adjacent the high-low valve and coupled to receive pressurized fluid from the first chamber and a still further chamber adjacent the high-low valve and coupled to a clutch in the planetary section, and wherein the high-low valve is operative to couple the further chamber to the still further chamber to provide pressurized fluid to the clutch in the planetary section when the high-low valve is in the high position and to cut off the further chamber from the still further chamber when the high-low valve is in the low position.

8. A control device for a transmission comprising a housing having an elongated bore therein, a pressure regulating valve mounted within and slidable along the length of the bore, a source of pressurized fluid, a first chamber communicating with the bore at a first location along the length of the bore, the first chamber being coupled to the source of pressurized fluid, an additional chamber communicating with the bore at a second location along the length of the bore closer to the pressure regulating valve than the first location, the additional chamber being coupled to provide pressurized fluid to the transmission and a resilient element for normally urging the pressure regulating valve into a position to cut off communication between the first and additional chambers via the bore except when the fluid pressure in the first chamber is greater than a predetermined minimum level.

9. The invention set forth in claim 8, further including a further chamber communicating with the bore at a third location between the first location and the second location, the further chamber being coupled to the transmission to provide pressurized fluid to perform at least one function different from a function performed by pressurized fluid provided the transmission from the additional chamber.

10. The invention set forth in claim 8, wherein the pressure regulating valve has a plunger of reduced diameter at an end thereof adjacent the first and second locations, and further including a resiliently mounted contact assembly mounted within the bore adjacent the first location and a warning light coupled to the contact assembly, the contact assembly being operative to illuminate the warning light when contacted by the plunger and being operative to undergo movement along the bore following contact by the plunger in response to continued movement of the pressure regulating valve along the bore following contact by the plunger.

11. The invention set forth in claim 8, further including a control lever having an opposite pair of detent recesses, a pair of elements disposed on opposite sides of the control lever and movable into engagement with the detent recesses in the control lever when the control lever is in a predetermined position and means coupling the elements to the first chamber to apply fluid pressure from the first chamber to hold the elements in the detent recesses.

12. The invention set forth in claim 11, wherein each of the pair of elements comprises a member having an internal bore, a plunger slidably mounted within the bore and a ball mounted at one end of the plunger for engagement with one of the detents in the control lever, and the means coupling the elements to the first chamber includes means for coupling the first chamber to the bore at an end of the plunger opposite the ball.

13. A control device for a transmission having first and second pluralities of hydraulic fluid operated members comprising the combination of a source of pressurized fluid, a first chamber coupled to the source of pressurized hydraulic fluid and to the first plurality of hydraulic fluid operated members, an additional chamber normally communicating with the first chamber and coupled to the second plurality of hydraulic fluid operated members, and means responsive to hydraulic fluid pressure within the first chamber below a predetermined threshold level for blocking communication of the first chamber with the additional chamber.

14. The invention set forth in claim 13, wherein the first plurality of hydraulic fluid operated members includes a high-low control valve and means for hydraulically maintaining a power takeoff control in an engaged position, and the second plurality of hydraulic fluid operated members includes a power takeoff control valve, a front wheel drive control valve and a plurality of high priority hydraulic fluid lubricated members.

15. A control device for a transmission comprising the combination of a valve, a pivotably mounted control lever coupled to the valve, the control lever being pivotable between on and off positions, a chamber coupled to receive pressurized hydraulic fluid, means coupling the chamber to the valve, the valve including means responsive to hydraulic fluid pressure less than a predetermined threshold value in the chamber for pivoting the control lever from the on position to the off position when the control lever is in the on position, and a detent mechanism disposed adjacent the control lever and coupled to the chamber, the detent mechanism being responsive to pressurized hydraulic fluid in the chamber and to movement of the control lever into the on position to lock the control lever in the on position.

16. The invention set forth in claim 15, wherein the control lever has an opposite pair of recessed portions thereof and the detent mechanism includes a housing defining a pair of apertures disposed on opposite sides of the control lever, means coupling each of the pair of apertures to the chamber, and a pair of elements slidably disposed in the apertures and operative to engage the recessed portions of the control lever in response to pressurized hydraulic fluid in the chamber when the control lever is in the on position.

17. A control device for a transmission comprising the combination of a housing having an elongated aperture therein, a high-low control valve slidably mounted between high and low positions within the elongated aperture, a chamber within the housing coupled to receive pressurized hydraulic fluid, an inlet coupled to the chamber and to the aperture at a first location along the length of the aperture, an outlet coupled to the aperture at a second location along the length of the aperture spaced-apart from the first location, the outlet being adapted to be coupled to a portion of the transmission to be controlled by the high-low control valve, the inlet and the outlet being coupled to each other when the control valve is in the high position and being cut off from each other when the control valve is in the low position, a resilient element for moving the control valve to the low position, and means coupled to the chamber for applying pressurized hydraulic fluid from the chamber to maintain the control valve in the high position against the urging of the resilient element when the control valve is moved into the high position.

18. The invention set forth in claim 17, wherein the means for applying pressurized hydraulic fluid includes a second elongated aperture in the housing, a second valve slidably mounted within the second elongated aperture, conduit means coupling the second elongated aperture to the first elongated aperture, means coupling the second elongated aperture to the chamber, means for normally urging the second valve into a first position to cut off the conduit from the chamber, and wherein the second valve includes means responsive to pressurized hydraulic fluid from the chamber for urging the second valve into a second position to couple the chamber via the conduit to the first-mentioned elongated aperture whereby pressurized hydraulic fluid from the chamber is applied to the first-mentioned aperture to permit the high-low control valve to be in the high position against the urging of the resilient element.

19. The invention set forth in claim 18, wherein the means coupling the second elongated aperture to the chamber includes a check valve, and further including a spring-loaded detent mechanism for resiliently retaining the high-low control valve in the high position or the low position.

20. A control device for a transmission comprising a housing having a chamber coupled to receive pressurized hydraulic fluid, a first generally cylindrical bore therein, a second generally cylindrical bore therein, a first conduit within the housing coupling the chamber to the first bore at a first location therein, a second conduit within the housing coupled to the first bore at a second location therein different from the first location, a third conduit within the housing coupling the chamber to a first end of the second bore, a fourth conduit within the housing coupled between a portion of the second bore spaced-apart from the first end of the second bore and a first end of the first bore, a generally cylindrical control valve disposed within the first bore, a downshift piston disposed within the first bore and coupled to the control valve so as to be movable relative to the control valve by a predetermined amount, the control valve being slidable between a first position and a second position in which the control valve is a greater distance from the first end of the first bore than the first position, the control valve blocking the second conduit from the first conduit when in the first position and having a portion of reduced diameter disposed adjacent the first and second locations to couple the second conduit to the first conduit via the first bore when the control valve is in the second position, a resilient detent mechanism mounted within the housing at the first bore and resiliently urging the control valve into the first position or the second position, a first spring disposed within the first bore and operative to normally urge the downshift piston toward the first end of the first bore and the coupled control valve into the first position, a second generally cylindrical valve slidably disposed within the second bore and a second spring disposed within the second bore and operative to normally urge the second valve toward the first end of the second bore, the second valve being operative to block the third conduit from the fourth conduit when moved into a position adjacent the first end of the secoond bore by the second spring and to permit coupling of the third conduit to the fourth conduit when moved a sufficient distance away from the first end of the second bore against the urging of the second spring by pressurized hydraulic fluid from the chamber provided to the first end of the second bore by the third conduit.

* * * * *

UNITED STATES PATENT AND TRADEMARK OFFICE
CERTIFICATE OF CORRECTION

PATENT NO. : 4,296,649

DATED : October 27, 1981

INVENTOR(S) : Gordon L. Marquart

It is certified that error appears in the above-identified patent and that said Letters Patent are hereby corrected as shown below:

Column 6, line 13, after "73" and before "into", strike "element". Column 8, line 13, after "detent", strike "132"; line 13, after "recesses" and before the comma (","), insert --132--; line 30, after "136" and before "are", strike "in FIG. 4". Column 9, line 20, after "the" (first occurrence) strike "springs"; line 21, after "and" (first occurrence) and before "176", strike "within the" and insert --springs--; line 21, after "178" and before "valve", insert --within the--; line 42, after "FIG. 1" and before the comma (","), insert --to an elongated--; line 44, before "high-low", "A" should read --The--; line 60, after "chamber", insert --82--. Column 10, line 24, after "30" insert --. The spring 73--; line 35, after "of" and before the comma (","), "enlongated" should read --elongated--. Column 16, lines 22 and 23, "secoond" should read --second--.

Signed and Sealed this

Twelfth Day of January 1982

[SEAL]

Attest:

GERALD J. MOSSINGHOFF

Attesting Officer

Commissioner of Patents and Trademarks